E. ARNOLD & J. L. LA COUR.
ARRANGEMENT FOR REGULATION OF SPEED OF COMPENSATED SINGLE PHASE MOTORS.
APPLICATION FILED NOV. 23, 1908.
940,492.
Patented Nov. 16, 1909.
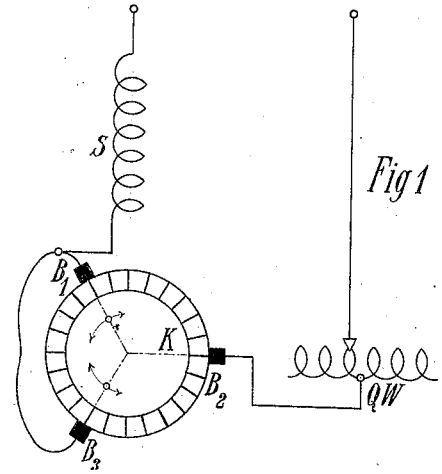
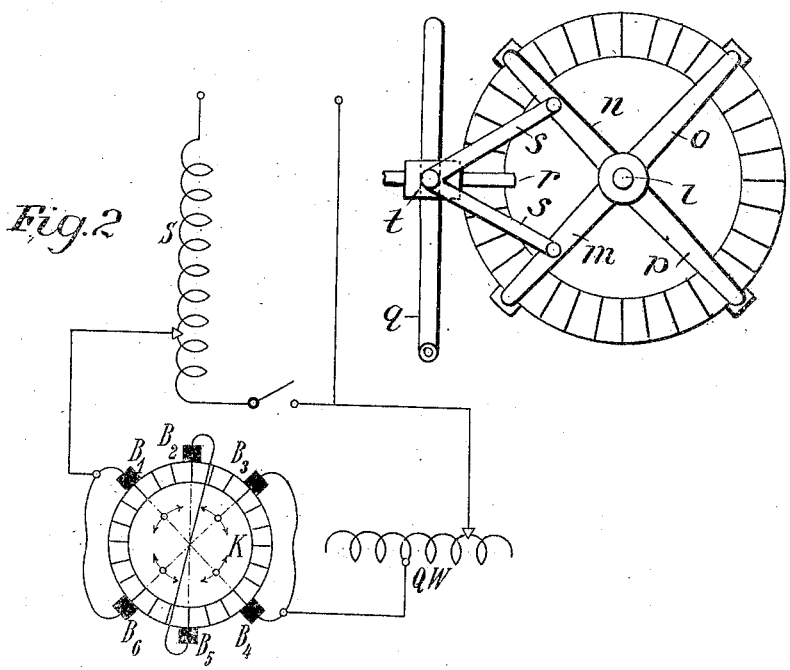

UNITED STATES PATENT OFFICE.

ENGELBERT ARNOLD, OF KARLSRUHE, GERMANY, AND JENS LASSEN LA COUR, OF VESTERAS, SWEDEN.

ARRANGEMENT FOR REGULATION OF SPEED OF COMPENSATED SINGLE-PHASE MOTORS.

940,492.

Specification of Letters Patent.    Patented Nov. 16, 1909.

Application filed November 23, 1908. Serial No. 464,038.

*To all whom it may concern:*

Be it known that we, ENGELBERT ARNOLD, a subject of the German Emperor, and a resident of Karlsruhe, Grand Duchy of Baden, Germany, and JENS LASSEN LA COUR, a subject of the King of Denmark, and resident at Vesteras, Sweden, have invented certain new and useful Improvements in an Arrangement for Regulation of Speed of Compensated Single-Phase Motors, of which the following is a specification.

In our prior application, Serial No. 260,521, filed May 15, 1905, we have disclosed a compensated single-phase motor with an auxiliary stator coil in quadrature with the main stator coil and which is provided with a variable number of turns for use in starting and regulating the speed of the motor. The variation in the ratio of the ampere turns of the auxiliary stator winding and the change in the value of the exciting current of the rotor in the arrangement described in said prior application, is effected by varying the number of turns of the auxiliary winding connected in circuit.

In our present invention the change in the ratio of the ampere turns of the auxiliary winding and the variation in the exciting current of the rotor is effected by shifting the position of the brushes leading the exciting current to the rotor winding. In order that the position of the brushes may be thus changed we employ pairs of brushes electrically connected and provide that each of the brushes shall be adjustable toward and away from each other.

For a more complete understanding of our invention, reference is made to the following description, taken in connection with the accompanying drawings, while the scope of the invention is to be determined by consideration of the appended claims.

Figure 1 of the drawings is a diagrammatic illustration of our invention applied to a series motor; and Fig. 2 shows its adaptation to a shunt motor. Fig. 3 shows the brush shifting mechanism.

In Fig. 1, the main stator winding S and the auxiliary winding QW, are displaced ninety degrees. It will be observed that the connections with the auxiliary winding are so arranged that the number of active turns thereof may be varied and the magnetic field produced thereby may be either in the same direction or in the opposite direction to that produced by the exciting current of the rotor. The current is led to the commutator K of the rotor by means of three brushes, of which $B_2$ is connected to the auxiliary winding while $B_1$ $B_3$ are provided with a short-circuit connection and are connected in series with the main stator winding. The brushes $B_1$ $B_3$ are each movable around the commutator and may be shifted simultaneously in a manner to alter their angular relation and the arc of the commutator embraced between them and at the same time maintaining the magnetic axis of the compensating circuit of the rotor winding included by the short circuit between said brushes, substantially coincident with the axis of the stator winding S, and in quadrature with the exciting circuit of the rotor extending between the brush $B_2$ and the pair of brushes $B_1$ $B_3$. It is apparent that by shifting the position of the brushes in the manner above described, the number of ampere turns included in the exciting circuit of the rotor may be varied and that for any given number of active turns of the auxiliary winding QW, the ratio of the ampere turns of the exciting circuit of the rotor to that of the auxiliary winding may be changed, and that the speed of the motor may be varied in this manner.

Fig. 2 illustrates the manner in which our present invention may be applied to a shunt motor. We have shown the exciting current led into the rotor by means of two pairs of short-circuited brushes, $B_1, B_6,$ and $B_3, B_4,$ respectively, arranged upon opposite sides of the commutator and connected to the auxiliary winding QW and the main stator winding S, the latter by means of an adjustable connection so as to include more or less of the winding in circuit therewith. Each pair of short-circuited brushes are arranged so that the members thereof may be shifted toward and from each other in the manner described in connection with the short-circuited pair of Fig. 1, and the members of both pairs may be shifted simultaneously. In this manner the compensated field generated in the parallel short-circuited sections of the rotor winding embraced between the short-circuited brushes, may always be maintained coincident with the field of the stator winding S, and in quadrature with the field of the exciting circuit of the rotor and the field of the auxiliary winding QW. It is apparent from the diagram that provision is made for the variation of the active turns of the auxiliary winding and of the direction thereof in the manner set forth in describing Fig. 1.

In the arrangement shown in Fig. 2, we have also shown a pair of independent brushes $B_2$, $B_5$, short-circuited upon themselves upon a line coincident with the field of the stator winding S. These brushes always remain in the same position and provide an energy circuit for the rotor winding closed upon itself with a constant number of turns. If this independent pair of brushes is used for the energy circuit of the rotor, one of the brushes of each of the opposite pairs may be dispensed with as $B_4$, $B_6$, and the remaining brushes $B_1$, $B_3$ for the exciting current may be shifted simultaneously at equal angles in opposite directions from the magnetic axis of the winding QW.

The arrangement above described for varying the speed by shifting the brushes about the commutator differs entirely from the well known shifting of the brushes of a repulsion motor. In the latter type the shifting of the brushes causes a shifting of the magnetic axis of the rotor with respect to the axis of the stator winding, while in our invention, on the contrary, there are two rotor circuits whose magnetic axes remain unchanged in direction while the number of ampere turns in these circuits is varied.

Fig. 3 shows a well known form of mechanism which may be used for shifting the brushes. Upon the shaft $l$ are pivotally mounted four arms $m$, $n$, $o$, $p$, carrying the brushes. The arms $n$ and $p$ and the arms $m$ and $o$ are rigidly connected. A hand lever $q$ is pivotally mounted upon the base of the machine and is connected to a cross head $t$ which slides upon a guide $r$ also mounted on the base of the machine. Links $s$, $s$ connect the cross head $t$ with the arms $m$ and $n$. By means of this arrangement it will be seen that when the lever $q$ is moved back and forth all of the brushes are simultaneously moved, as indicated by arrows in Fig. 2. This mechanism is therefore adapted to shift brushes of the form shown in Fig. 2. In order to adapt this shifting mechanism to the form shown in Fig. 1, the arms $o$ and $p$ are omitted and the brush $B_2$ is independently mounted.

Having thus described our invention and the manner in which it may be embodied in different types of motors, what we claim and desire to secure by Letters Patent of the United States, is—

1. In a compensated alternating current motor, in combination, a stator winding, a rotor winding having a commutator, brushes bearing on the commutator arranged to form with the rotor winding exciting and compensating circuits, and means whereby the amount of rotor winding included between the brushes of the exciting circuit may be varied without changing the direction of the magnetic axis of the compensating circuit.

2. In a compensated alternating current motor, in combination, a main stator winding, a rotor winding having a commutator, brushes bearing on the commutator arranged to form with the rotor winding exciting and compensating circuits, an auxiliary stator winding along the line of the magnetic axis of the exciting circuit, means whereby the amount of rotor winding included between the brushes of the exciting circuit may be varied without changing the direction of the magnetic axis of the compensating circuit, and means whereby the ampere turns of the auxiliary winding may be varied.

3. In a compensated alternating current motor, in combination, a main stator winding, a rotor winding having a commutator, brushes bearing on the commutator arranged to form with the rotor winding exciting and compensating circuits, an auxiliary stator winding along the line of the magnetic axis of the exciting circuit, means whereby the amount of rotor winding included between the brushes of the exciting circuit may be varied without changing the direction of the magnetic axis of the compensating circuit, and means whereby the ampere turns of the auxiliary winding may be reversed.

4. In a compensated alternating current motor, in combination, a main stator winding, a rotor winding provided with a commutator, brushes bearing on the commutator arranged to form with the rotor winding exciting and compensating circuits, an auxiliary stator winding along the magnetic axis of the exciting circuit, and means to shift the brushes toward and from each other without changing the direction of the axis of the compensating circuit.

5. In an alternating current motor, in combination, a rotor winding provided with a commutator, a stator winding having coils whose magnetic fields are in quadrature, brushes bearing on the commutator and connected in circuit with said stator coils on the line of one of said fields, certain of said brushes connected in a short-circuit on the line of the other magnetic field and arranged to be simultaneously adjusted toward and from each other.

6. In an alternating current motor, in combination, a rotor winding provided with a commutator, a stator winding having coils whose magnetic fields are in quadrature, brushes bearing on said commutator and connected in circuit with said stator coils on the line of one of said fields, and certain of said brushes connected together on the line of the other magnetic field and arranged to be adjusted simultaneously toward and from each other, and means for varying the ampere turns of one stator coil and for reversing the direction of its magnetic field.

In testimony whereof we affix our signatures in presence of two witnesses.

ENGELBERT ARNOLD.
JENS LASSEN LA COUR.

Witnesses to signature of E. Arnold:
   Jos. H. LEUTE,
   TERESA CATTURANI.

Witnesses to signature of Jens la Cour
   ALFRED FRAENCKEL,
   MARTIN RADT.